US009842141B2

United States Patent
Chen et al.

(10) Patent No.: US 9,842,141 B2
(45) Date of Patent: *Dec. 12, 2017

(54) RANGE QUERY METHODS AND APPARATUS

(71) Applicant: International Business Machines Corporation, Armonk, NY (US)

(72) Inventors: Shyh-Kwei Chen, Chappaqua, NY (US); Kun-Lung Wu, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,042

(22) Filed: Mar. 11, 2016

(65) Prior Publication Data

US 2016/0196309 A1 Jul. 7, 2016

Related U.S. Application Data

(60) Continuation of application No. 13/940,815, filed on Jul. 12, 2013, now Pat. No. 9,336,273, and a division of application No. 11/155,221, filed on Jun. 17, 2005, now Pat. No. 8,543,579.

(51) Int. Cl.
*G06F 17/30* (2006.01)

(52) U.S. Cl.
CPC .. *G06F 17/30516* (2013.01); *G06F 17/30241* (2013.01); *G06F 17/30312* (2013.01); *G06F 17/30463* (2013.01)

(58) Field of Classification Search
CPC ......... G06F 17/30516; G06F 17/30241; G06F 17/30463; G06F 17/30312
See application file for complete search history.

(56) References Cited

U.S. PATENT DOCUMENTS

| | | | |
|---|---|---|---|
| 5,664,172 A | 9/1997 | Antoshenkov | |
| 5,761,652 A | 6/1998 | Wu et al. | |
| 5,915,251 A | 6/1999 | Burrows et al. | |
| 2002/0052674 A1* | 5/2002 | Chang | G06F 17/3087 700/300 |

(Continued)

OTHER PUBLICATIONS

Antonin Guttman, "R-Trees: A Dynamic Index Structure for Spatial Searching," Proceedings of ACM SIGMOD International Conference on Management of Data, Jun. 1984, pp. 47-57, vol. 14, No. 2.

(Continued)

*Primary Examiner* — Cam-Y Truong
(74) *Attorney, Agent, or Firm* — Kurt P Goudy; Ryan, Mason & Lewis, LLP

(57) ABSTRACT

Range query techniques are disclosed for use in accordance with data stream processing systems. A technique is provided for incrementally processing continual range queries against moving objects. This technique is applicable for location-aware services and applications. A technique for evaluating one or more continual range queries over one or more moving objects comprises maintaining a query index with one or more containment-encoded virtual constructs associated with the one or more continual range queries over the one or more moving objects, and incrementally evaluating the one or more continual range queries using the query index.

16 Claims, 9 Drawing Sheets

(56) References Cited

U.S. PATENT DOCUMENTS

| | | |
|---|---|---|
| 2005/0071083 A1 | 3/2005 | Chen et al. |
| 2005/0071321 A1 | 3/2005 | Chen et al. |
| 2005/0101346 A1 | 5/2005 | Wozniak et al. |
| 2005/0222978 A1 | 10/2005 | Drory et al. |
| 2006/0101045 A1 | 5/2006 | Chen et al. |

OTHER PUBLICATIONS

D.V. Kalashnikov et al., "Efficient Evaluation of Continuous Range Queries on Moving Objects," Proceedings of 13th International Conference on Database and Expert Systems Applications (DEXA), Sep. 2002, pp. 1-17, Aix-en-Provence, France.

Y.-H. Tsai et al., "A Strip-Splitting-Based Optimal Algorithm for Decomposing a Query Window," IEEE Transactions on Knowledge and Data Engineering, Apr. 2004, pp. 519-523, vol. 16, No. 4.

D.S. Wise et al., "Language Support for Morton-Order Matrices," Proceedings of the Eighth ACM SIGPLAN Symposium on Principles and Practices of Parallel Programming (PPoPP), Jul. 2001, pp. 24-33, vol. 36, No. 7.

H.D. Chon et al., "Range and kNN Query Processing for Moving Objects in Grid Model," Mobile Networks and Applications, Aug. 2003, pp. 401-412, vol. 8, No. 4.

\* cited by examiner

RANGE QUERY METHODS AND APPARATUS

CROSS REFERENCE TO RELATED APPLICATION(S)

This application is a Continuation of U.S. patent application Ser. No. 13/940,815, filed on Jul. 12, 2013, which is a Divisional of U.S. patent application Ser. No. 11/155,221, filed on Jun. 17, 2005, the disclosures of which are fully incorporated herein by reference. This application is related to the U.S. patent application identified by Ser. No. 10/982,570, filed on Nov. 5, 2004, and entitled "Methods and Apparatus for Interval Query Indexing," the disclosure of which is incorporated by reference herein.

This invention was made with Government support under Contract Number H98230-04-3-0001 awarded by the U.S. Department of Defense. The Government has certain rights in this invention.

FIELD OF THE INVENTION

The present invention generally relates to the processing of data streams and, more particularly, to range query techniques for use in processing data streams.

BACKGROUND OF INVENTION

A large number of continual range queries can be issued against a rapid data stream in order to monitor various activities and conditions. For example, in a financial stream application, various continual range queries can be created to monitor the prices and volumes of stocks and bonds. In a sensor network application, continual range queries can be used to monitor the temperatures, humidity, flow of traffics and many other readings.

Note that because these monitoring queries are evaluated repeatedly and continually against the incoming data stream, they are called continual queries. They are in contrast to regular queries that are usually evaluated only once.

As the data stream flows in an increasingly rapid rate, the processing of continual range queries becomes more difficult, if not impossible, because the processing power of the central processing unit (CPU) of the computing system doing the monitoring quickly becomes limited. Data items may have to be dropped without processing. Namely, some of the workload is shed. However, it is more desirable that a system process as many continual queries as possible against a stream that may be rapid. Hence, it is important that only the potentially relevant queries are evaluated against each data item in the stream.

One approach to quickly identifying relevant queries for processing is to use a query index. Each data point in an incoming stream is used to search the query index to find the range queries containing the data point. This is referred to as the stabbing query problem, i.e., finding the range queries that are stabbed by a data point. Though maybe conceptually simple, it is quite challenging to design an effective two-dimensional range query index in a stream environment, especially if the stream flows rapidly. The range query index is preferably main-memory-based and it must have two important properties: low storage cost and fast search time. Low storage cost is important so that the entire query index can be loaded into main memory. As a result, potential performance degradation due to paging can be avoided during index search operations. Fast search time is critical so that the system can handle a rapid stream.

Range queries are generally difficult to index. Though existing spatial indexes, such as R-trees (see, e.g., A. Guttman, "R-trees: A Dynamic Index Structure for Spatial Searching," Proceedings of ACM SIGMOD International Conference on Management of Data, 1984, the disclosure of which is incorporated by reference herein), can be used to index range queries, most of them are disk-based approaches. Hence, they are generally not suitable for a stream environment where a main memory-based approach is preferable for fast search performance.

A main memory-based query index, called VCR-based query index, has recently been proposed for fast event matching, see the U.S. patent application identified by Ser. No. 10/671,938, filed on Sep. 29, 2003, and entitled "System and Method for Monitoring Events Against Continual Range Queries," the disclosure of which is incorporated by reference herein. A set of predefined virtual construct rectangles, or VCRs, are used to indirectly pre-compute search results. Range queries are first decomposed into one or more VCRs. Each VCR has a unique identifier (ID) and an associated query ID list storing the IDs of queries that use it in their decompositions. A search is conducted indirectly via the VCRs by identifying the covering VCRs for a given data point. Even though it is a main memory-based approach, such VCR-based query index was not specifically designed for stream processing. The number of VCRs covering a data point can be rather high, degrading search performance.

VCR-based query index belongs to a class of main-memory index based on predefined virtual constructs (VC). VCs are used to decompose a range query. Each VC is associated with a query ID list, storing the queries covering that VC. For each incoming data point, a search is conducted by computing the VCs that cover said data point.

Existing VC-based query indexes can be divided into two categories based on the VC size: fixed-sized and variable-sized. The VCR-based approach is variable-sized, but the number of covering VCs can be large and it is not adaptive. There are two fixed-sized approaches. One uses unit-sized grid cells and the other uses grid cells of size $L \times L$, where $L > 1$, see "Efficient Evaluation of Continuous Range Queries on Moving Objects," Proceedings of International Conference on Database and Expert Systems Applications, 2002, the disclosure of which is incorporated by reference herein. The unit-sized grid cells are problematic since the number of VCs needed to decompose a query can be high, resulting in high storage cost. The grid cells of size $L \times L$, where $L > 1$, are problematic because a range query can partially intersect with a grid cell, causing ambiguity on whether or not a range query really covers a data point. Moreover, the grid cell approach is not adaptive to changes in the distributions of query sizes and query positions.

Hence, a need is recognized to have a new and more effective main memory-based two-dimensional range query index for efficient stream processing.

Furthermore, with the advances in mobile computing and location-sensing technologies, location-aware services and applications have become possible. Such applications can be used to deliver relevant, timely and engaging content and information to targeted customers. For example, a retail store in a shopping mall can send timely electronic coupons (e-coupons) to the personal digital assistants (PDAs) or cell-phones of potential customers who are close to the store.

To provide location-aware services and applications, one must first know where moving objects are currently located. A set of continual range queries, each defining the geographical regions of interest, can be repeatedly re-evaluated to locate moving objects. For example, we can place a square or a circle around the location of a hotel, an apartment building, or a subway exit. By periodically re-evaluating a continual query defined by the square or circle, we can locate the moving objects that are currently located within the square or circle.

It is thus evident that efficient processing of a set of continual range queries over moving objects is critically important for providing location-aware services and applications.

Query indexing has been used to speed up the processing of continual static range queries over moving objects. By "static" here, it is meant that the regions of continual range queries remain stationary. With query indexing, periodically, each object position is used to search the query index to find all the range queries that contain the object. Once the containing range queries are identified, the object identifier (ID) is inserted into the results associated with the identified queries. After every object position is searched against the query index, the most up-to-date results for all the continual range queries are available.

With query indexing, it is paramount that the time taken to perform periodic query evaluation be as brief as possible.

In the U.S. patent application identified by Ser. No. 10/671,932, filed on Sep. 29, 2003, and entitled "Method and Structure for Monitoring Moving Objects," the disclosure of which is incorporated by reference herein, a shingle-based query indexing approach was disclosed for processing of continual range queries over moving objects. A shingle may be defined as a digital representation of a tile-like object laid to cover a digital representation of an area (e.g., a geographical area), without necessarily being laid in overlapping rows. Shingles are predefined virtual construct rectangles (VCR). They are used to decompose query regions and to store indirectly pre-computed search results. However, shingles defined in such an approach may be redundant, slowing down each index search operation and the query processing time.

Hence, a need is recognized to have new and more effective techniques for processing of continual static range queries over moving objects for providing location-aware services and applications.

SUMMARY OF THE INVENTION

The present invention provides range query techniques for use in accordance with data stream processing systems.

In one aspect of the invention, a technique is provided for indexing continual range queries for use in data stream processing. For example, a technique for use in processing a data stream comprises obtaining at least one range query to be associated with the data stream, and building a range query index based on the at least one range query using one or more virtual constructs such that the query index is adaptive to one or more changes in a distribution of range query sizes. The step/operation of building the range query index may further comprise building the range query index such that the range query index accommodates one or more changes in query positions outside a monitoring area of the at least one range query.

In another aspect of the invention, a technique is provided for incrementally processing continual range queries against moving objects. This may be done for location-aware services and applications. For example, a technique for evaluating one or more continual range queries over one or more moving objects comprises maintaining a query index with one or more containment-encoded virtual constructs associated with the one or more continual range queries over the one or more moving objects, and incrementally evaluating the one or more continual range queries using the query index.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1A:
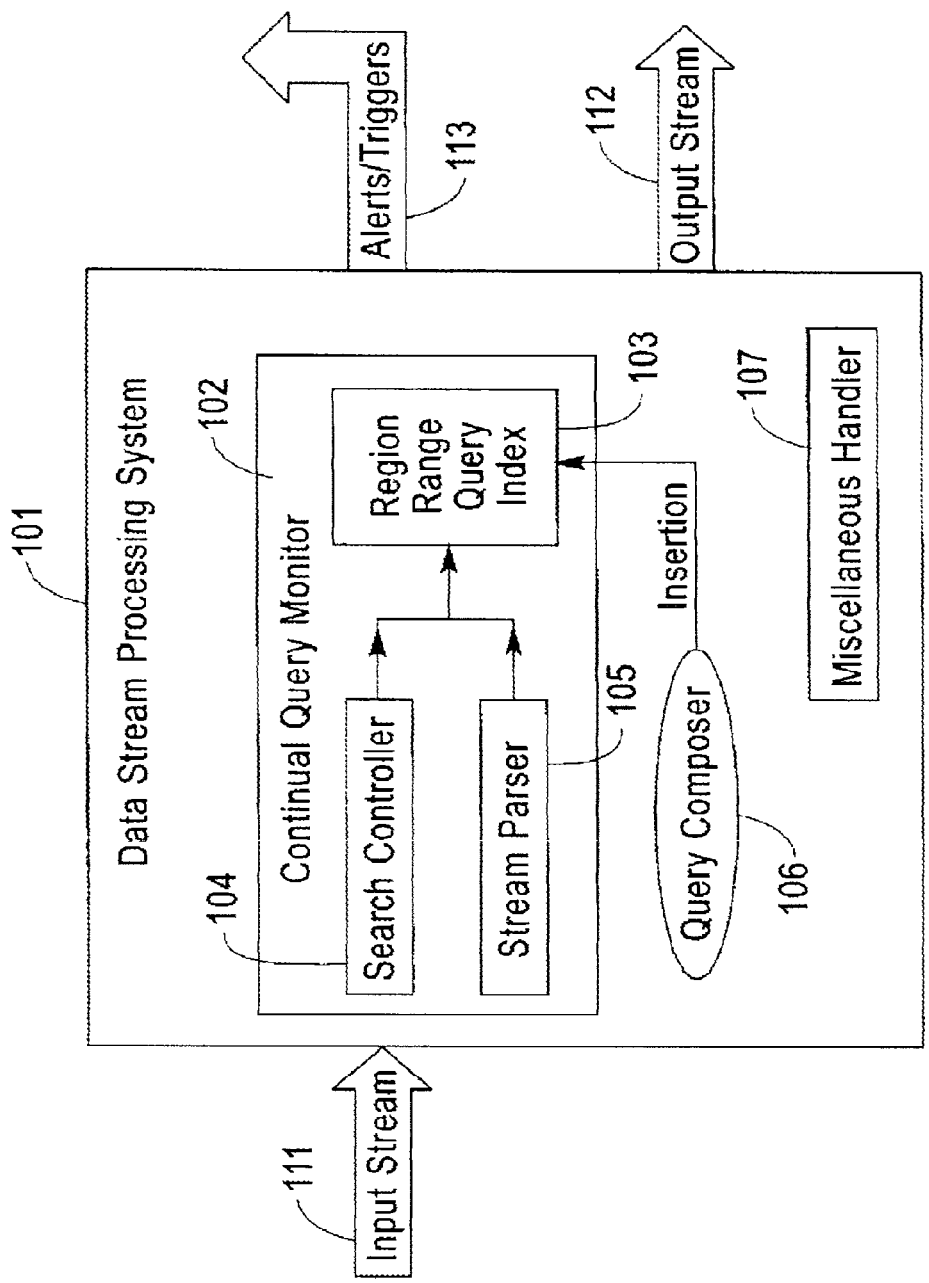
FIG. 1A is a diagram illustrating a data stream processing system, according to one embodiment of the present invention.

It is to be understood that while the present invention may be described below in the context of exemplary data stream applications, the invention is not so limited. Rather, the invention is more generally applicable to any data stream application in which it would be desirable to provide effective range query techniques.

Furthermore, while we focus on range queries in a two dimensional space that are specified as rectangles, such as $(x_1 \leq X \leq x_2) \wedge (y_1 \leq Y \leq y_2)$ on two independent attributes X and Y, those skilled in the art will appreciate that the principles of the invention can be generalized to deal with range queries in more than two dimensional spaces or in one dimensional space.

As will be illustratively explained, principles of the invention relate to indexing continual range queries for efficient data stream processing. In particular, a range query index is provided to efficiently monitor continual range queries against a data stream. The range query index is adaptive to changes in distributions of query sizes and query positions.

More specifically, for a range queries in a two dimensional space, each range query is first decomposed into one or more containment-encoded squares (CES) and the query identifier (ID) is stored into the query ID lists associated with the decomposed CESs. Thus, the index is based on a set of predefined CESs. CESs are predefined virtual constructs used to indirectly pre-compute search results. In particular, low storage cost and fast search time are made possible by the unique properties of containment-encoded squares. Such a CES-based range query index is also adaptive to changes in query sizes and positions for efficient stream processing.

CESs are illustratively defined as follows: (1) the monitoring region is divided into one or more square partitions; and (2) each partition is recursively divided into four squares until the side length is one. Each data point (also referred to herein as "data item") from the stream is used to search the query index to identify all the queries that cover said data point.

Therefore, in a CES-based query index, the monitoring area is first divided into many square partitions of size L×L, where $L=2^k$ and L is the maximal side length of a CES. For each partition, k additional levels of virtual squares are defined by successively subdividing each virtual square at one level into four equal-sized quadrants, similar to the quad-tree space partition. The division process ends when the virtual squares are of size 1×1. In other words, $\log(L)+1$ levels of virtual squares are defined, where containment relationships exist between virtual squares at different levels. The size of a virtual square at level i is four times that of a virtual square at level i+1, where $0 \leq i < k$. These virtual squares are defined and labeled such that containment relationships are encoded in their IDs.

A strip-splitting-based algorithm is provided to decompose a range query into a set of unique maximal-sized CESs. In one illustrative embodiment, the strip-splitting-based algorithm adapts a decomposition algorithm as disclosed in Tsai et al., "A Strip-Splitting-Based Optimal Algorithm For Decomposing A Query Window Into Maximal Quad-Tree Blocks," IEEE Transactions on Knowledge and Data Engineering, 16(4): 519-523, April 2004, the disclosure of which is incorporated by reference herein. However, the invention is not limited to adaptive use of this particular decomposition algorithm.

The query ID is then inserted into the query ID lists associated with the decomposed CESs. A simple bottom-up search algorithm is provided. It takes advantage of the containment encoding embedded in the IDs of virtual squares. Search operations are efficient because from the encoding of the smallest CES containing a data point, the encodings of other containing CESs can be easily derived.

Principles of the invention also provide methods to deal with the changes in distributions of query sizes and query positions. Specifically, the CES-based query index is made adaptive to the increase and decrease of L and to the cases where range queries are outside the monitoring region.

Advantageously, illustrative techniques of the invention are able to simultaneously meet the following four general challenges to designing an effective virtual construct (VC) based query index.

First, there should be no ambiguity on whether or not a range query really covers a data point. In order to meet this challenge, each range query should be "perfectly" covered by one or more VCs. This is important so that a fast search time can be achieved by simply computing the VCs that cover a data point. Otherwise, costly computation may be needed to resolve the ambiguity. Thus, in accordance with illustrative principles of the invention, each range query may be perfectly covered by one or more VCs.

Second, each range query should be covered by a small number of VCs. Otherwise, the index storage cost can be high. Thus, in accordance with illustrative principles of the invention, the number of VCs covering a range query may be small.

Third, for any incoming data point, the data point should be covered by a small number of VCs in order to reduce the search time. Thus, in accordance with illustrative principles of the invention, the number of VCs covering any data point may be small.

Fourth, the query index should be adaptive to the changes in distributions of query sizes and query positions. This is because different queries can be dynamically inserted or deleted, resulting in changes in query sizes and query positions. Without adapting to the changes in query sizes and positions, the search performance can be degraded as a consequence. Thus, in accordance with illustrative principles of the invention, the range query index may be adaptive to changes in the distributions of query sizes and query positions.

Furthermore, principles of the invention also provide techniques for incrementally processing of continual range queries against moving objects for location-aware services and applications. These range queries define individual geographic regions of interest, such as, for example, a rectangle or a circle surrounding a building or a subway exit, and continually locate those moving objects that are within the query boundaries. A method for incremental processing of said continual range queries, which are indexed with said CESs, is provided to locate all the moving objects within each individual query boundaries. Thus, compared to existing VCR-based query indexing, there are fewer CESs defined than VCRs. The number of CESs visited during an index search in CES-based indexing is only $\log(L)+1$, much smaller than $(4L^2-1)/3$ in a square-only VCR-based indexing, where L is the maximal side length of a VC. Search time is hence significantly lowered. Moreover, containment encoding makes it easy to identify those VCs that need not be visited during an incremental query re-evaluation.

Also, it is to be noted that in such incremental continual range queries processing techniques, we focus on the cases where the regions of continual range queries remain stationary. Namely, they do not move. For examples, in New York City, individual continual range queries can be created around hotels, subway exits, airports, and other landmarks to monitor various moving objects, such as taxi cabs, cell-phones and PDAs. However, existing range queries can be removed while new range queries can be added.

FIG. 1A shows a system block diagram of data stream processing system 101 that employs a containment-encoded squares-based query index, according to an embodiment of the present invention. It is to be appreciated that, in one embodiment, data stream processing system 101 processes data items contained in an input stream 111. Data stream processing system 101 may generate alerts or triggers 113 for other actions after processing data items contained in input stream 111. Data stream processing system 101 may also generate an output data stream 112.

As shown, data stream processing system 101 comprises continual query monitor 102, which continually matches a data item in the input stream against a plurality of continual region range queries. Continual query monitor 102 comprises stream parser 105 and search controller 104. Stream parser 105 parses the data contained in the input stream 111 and extracts specific data values, which are then used by the search controller 104 to issue search operations (to be further described below in FIG. 6) on region range query index 103. If matched queries are found from a search operation, alerts or triggers 113 may be issued.

Region range query index 103 is constructed using a containment-encoded square indexing method according to the invention. A query composer 106 can be used for users to specify the region range queries. Each region range query can be specified with at least two pairs of endpoints, such as four integers. Once specified, the region range query is first decomposed (to be further specified in FIG. 4) into one or more CESs and inserted into the query index 103.

Finally, data stream processing system 101 may also comprise miscellaneous handler 107, which performs other processing tasks on the input data stream 111. For example, additional meta-data can be attached to the data stream after processing.

Figure 1B:
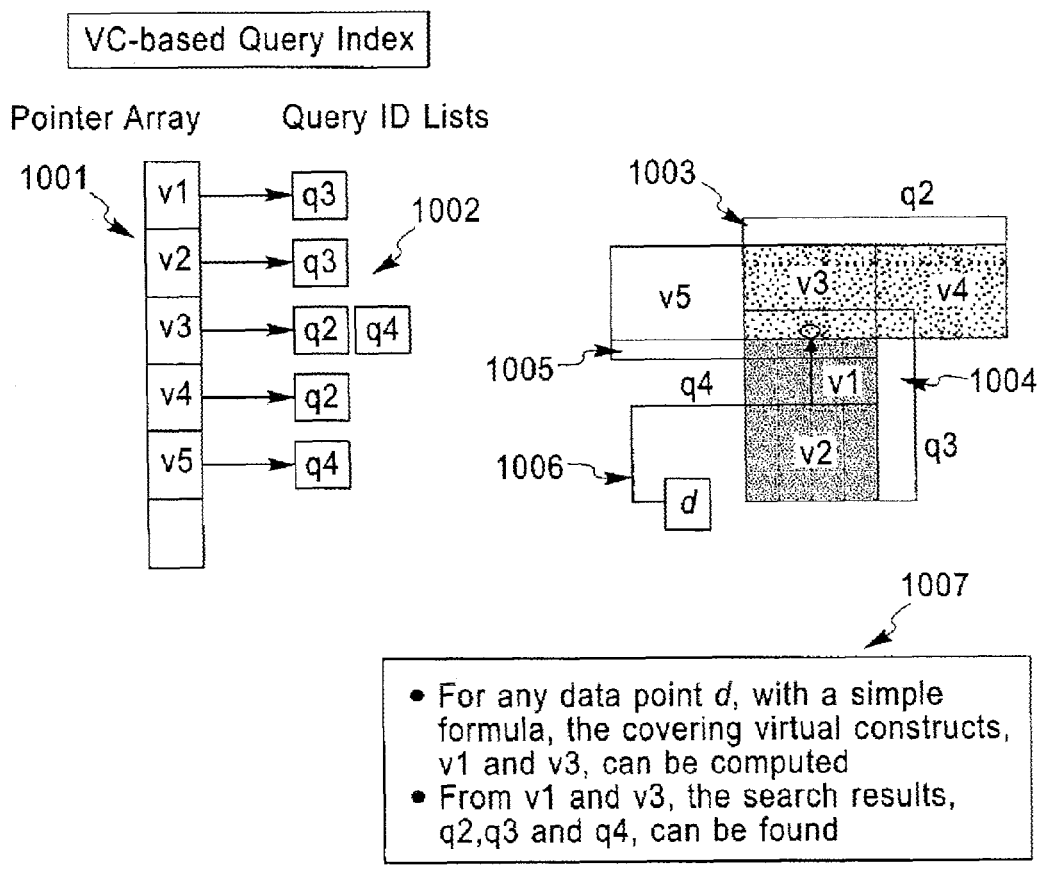
FIG. 1B is a diagram illustrating a concept of matching a data point against a set of region range queries, according to one embodiment of the present invention.

FIG. 1B shows, as an example, the concept of matching a data point against a set of region range queries using a general VC-based query index. Three region range queries are represented as three rectangles: q2 1003, q3 1004 and q4 1005. Five virtual constructs v1-v5 are used for region range query decomposition. Range query q2 1003 is decomposed into two virtual constructs v3 and v4. Range query q3 is decomposed into v1 and v2, while range query q4 is decomposed into v3 and v5.

The query index comprises a pointer array 1001 containing an entry for each virtual construct. Associated with each virtual construct is a query ID list 1002, which contains the query IDs that use that virtual construct in its decomposition. For example, q3 is maintained in the query ID lists associated with v1 and v2. During a search operation 1007, for any data point d 1006, the covering virtual constructs can be easily computed with a simple formula. In FIG. 1B, two virtual constructs v1 and v3 cover data point d. From v1 and v3 in the pointer array 1001, the search results, q2, q3 and q4, can be easily found.

The containment-encoded squares, CESs, described herein are a kind of virtual construct. They have advantageous properties for building efficient range query index for stream processing. A containment-encoded square (CES) index is constructed as follows. Each query range is first decomposed into one or more containment-encoded virtual squares. Then, the query ID is inserted into the ID lists associated with the decomposed CESs.

Figure 2:
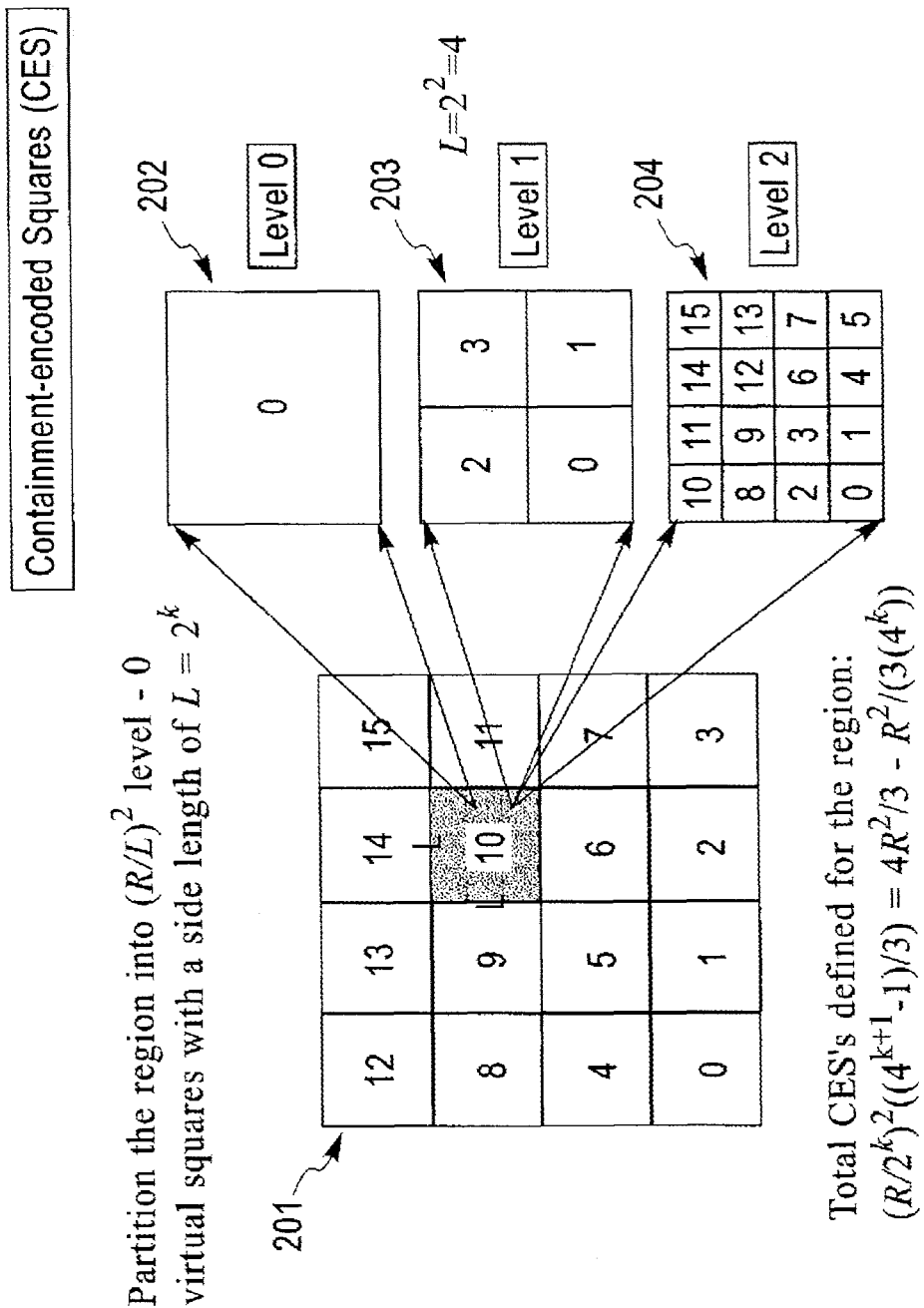
FIG. 2 is a diagram illustrating a definition of containment-encoded squares and their identifier labeling, according to one embodiment of the present invention.

FIG. 2 shows, as an example, a definition of containment-encoded squares and their ID labeling. Assume that the monitoring region is defined as a R×R region. Those skilled in the art will appreciate that the monitoring region need not be a square. It can be a region of any shape. In general, a bounding rectangle can be used to cover a region of arbitrary shape. Without loss of generality, we assume that $R=2^r$, where r is some integer. First, the entire R×R monitoring area 201 is divided into $$\left(\frac{R}{L}\right)^2$$

virtual squares, each of size L×L. For a general rectangular monitoring region, it can be divided into one and more virtual squares, each of size L×L. Here, we assume that $L=2^k$ and L is the maximal side length of a CES. The L×L squares are called the level-0 virtual squares 202. Then, k additional levels of virtual squares are created. Level-1 virtual squares 203 are created by dividing each level-0 virtual square into four equal-sized $$\frac{L}{2} \times \frac{L}{2}$$

virtual squares. Level-2 virtual squares 204 are created by partitioning each level-1 virtual squares into four equal-sized $$\frac{L}{4} \times \frac{L}{4}$$

virtual squares. Level-k virtual squares all have unit side length, i.e., 1×1.

The total number of CESs defined within each level-0 virtual square, including itself, is $$\sum_{i=0}^{i=k} 4^i = \frac{4^{k+1} - 1}{3}.$$

These virtual squares are defined to have containment relationships among them in a special way. Every unit-sized CES is contained by a CES of size 2×2, which is in turn contained by a CES of size 4×4, which is in turn contained by a CES of size 8×8, and so on.

A separate pointer array is used to map the two-dimensional virtual squares at each level into a linear order. Hence, there are k+1 pointer arrays for a CES-based query index. Within each level, the ID of a virtual square consists of two parts: a partition ID and the local ID within the partition. If a virtual square has a partition ID p and local ID $z_i$, then its unique ID $c_i$ at level i, where $0 \le i \le k$, can be computed as follows: $c_i = 4^i p + z_i$. This is because there are $4^i$ CESs within each partition at level i. The partition ID can be computed as the row scanning order of the level-0 CESs starting from the bottom row and moving upwards. For example, for a level-0 CES (a,b,L,L), where (a, b) is the bottom-left corner and L is the side length, its partition ID can be computed as follows:

$$P(a, b, L, L) = \frac{a}{L} + \left(\frac{b}{L}\right)\left(\frac{R}{L}\right).$$

Figure 3:
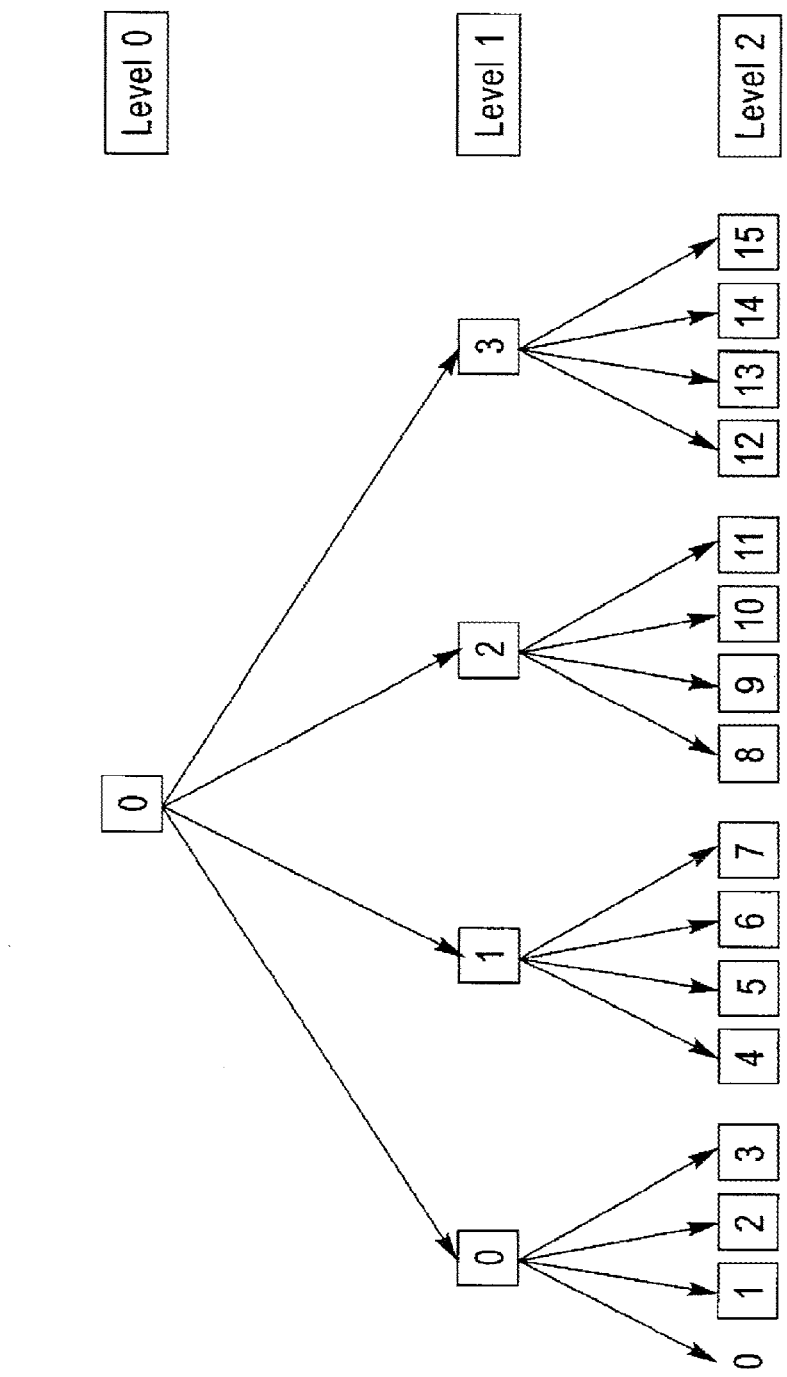
FIG. 3 is a diagram illustrating a perfect quaternary tree, according to one embodiment of the present invention.

The labeling of local CES IDs within a partition follows that of a perfect quaternary tree as shown in FIG. 3, where the IDs of the four child squares are 4s, 4s+1, 4s+2 and 4s+3, if the parent has a local ID s. In order to preserve containment relationships between virtual squares at different levels, the CES IDs within the same partition at each level follow the z-ordering space-filling curve, or Morton order (see, e.g., H. Samet, "Design and Analysis of Spatial Data Structures," Addison-Wesley, 1990, the disclosure of which is incorporated by reference herein). For example, in FIG. 2, the IDs for the 16 level-2 virtual squares for partition 10 follow the z-ordering space-filling curve. In general, the local IDs of 4s, 4s+1, 4s+2 and 4s+3 are assigned to the southwest, southeast, northwest and northeast children, respectively, of a parent virtual square with a local ID s.

Figure 4:
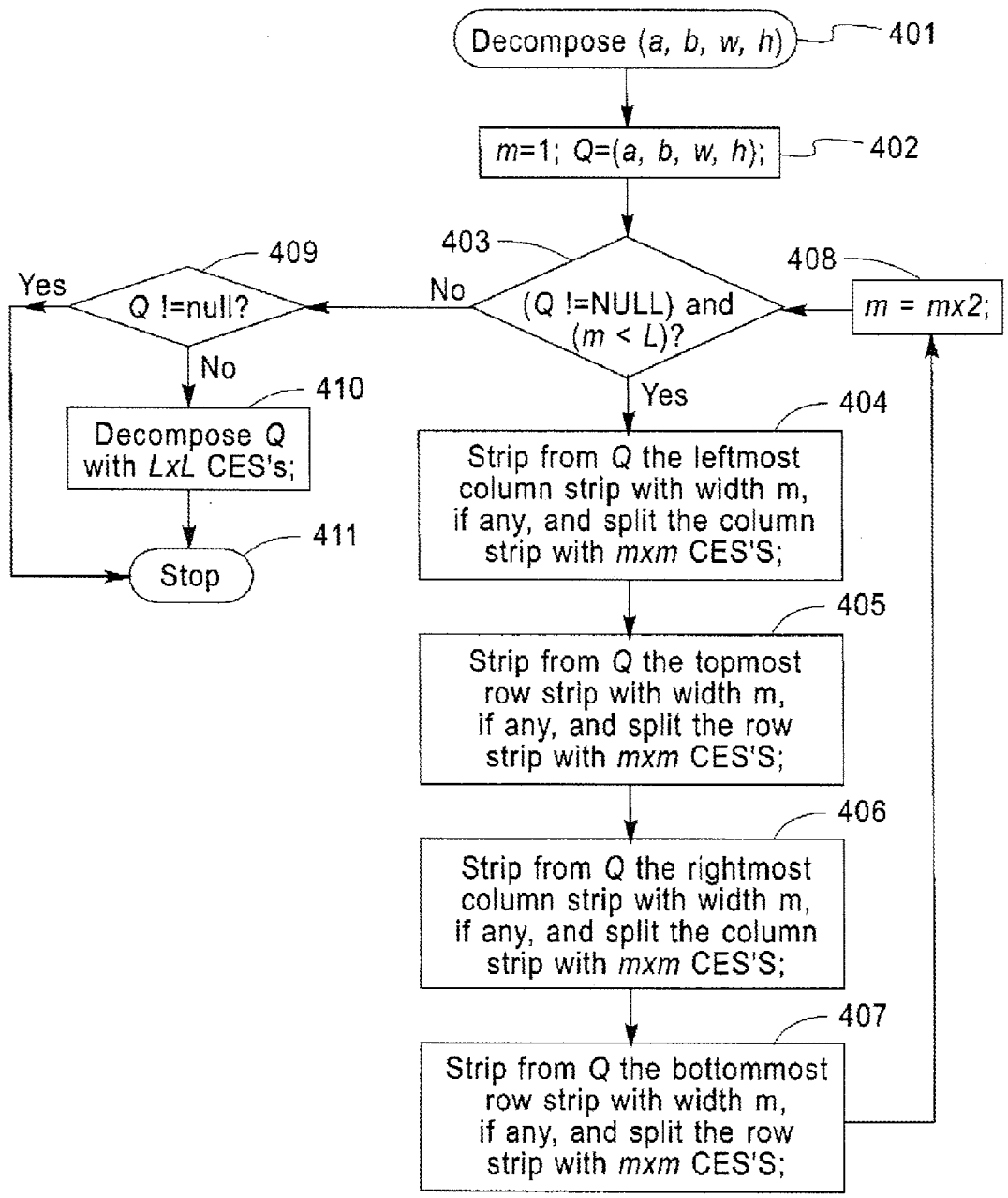
FIG. 4 is a diagram illustrating a methodology for decomposing a rectangle range query, according to one embodiment of the present invention.

FIG. 4 shows a flow chart diagram for decomposing a rectangle range query (a,b,w,h) (block 401) into one or more CESs, where (a,b) represents the bottom-left corner and w and h represent the width and height, respectively. In this particular illustrative embodiment, the process is a modification of a strip-splitting-based optimal algorithm for decomposing a query window into maximal quad-tree blocks by Y.-H. Tsai et al., "A Strip-Splitting-Based Optimal Algorithm for Decomposing a Query Window," in IEEE Transactions on Knowledge and Data Engineering, 16(4): 519-523, April 2004, the disclosure of which is incorporated by reference herein. One difference is that the algorithm in Tsai et al. allows m to be as large as log(R), assuming that $R=2^r$, r is some integer, and R is the side length of the monitoring area. In contrast, principles of the invention only allow m to be as large as $L=2^k$, the maximal side length of a CES.

The decomposition algorithm initially sets m=1 and Q=(a, b,w,h), the initial size of the range query, in step 402. The algorithm then performs multiple iterations of four strip-splitting processes in steps 404-407. In each iteration, it tries, if possible, to strip away from Q a column strip or a row strip of width or height of $m=2^i$, where $0 \le i < k$, from each of the four outside layers of Q, starting with i=0. The column strip or row strip is then split or decomposed into one and more m×m square blocks. The goal is to use a minimal number of maximal-sized CESs to decompose the entire Q. The entire strip-splitting process is like peeling a rectangular onion from the outside. The width of each layer at each successive iteration doubles (step 408) until it reaches L (steps 403 and 409). After that, the algorithm decomposes the remaining Q using L×L CESs, in step 410. The algorithm stops at block 411.

The rule to determine if there is any strip of width or height $2^i$ that can be removed from the remaining Q is based on the bottom-left corner, width and height of Q. Assume that the current remaining Q is denoted as (a',b',w',h'), if (a' mod $2^{i+1}$)≠0, then a column strip of width $2^i$, where $0 \le i < k$, can be removed from the leftmost of Q. If ((b'+h') mod $2^{i+1}$)≠0, then a row strip of height $2^i$ can be removed from the topmost of Q. If ((a'+w')mod $2^{i+1}$)≠0, then a column strip of width $2^i$ can be stripped from the rightmost of Q. Finally, if (b' mod $2^{i+1}$)≠0, then a row strip of height $2^i$ can be removed from the bottommost of Q.

Figure 5:
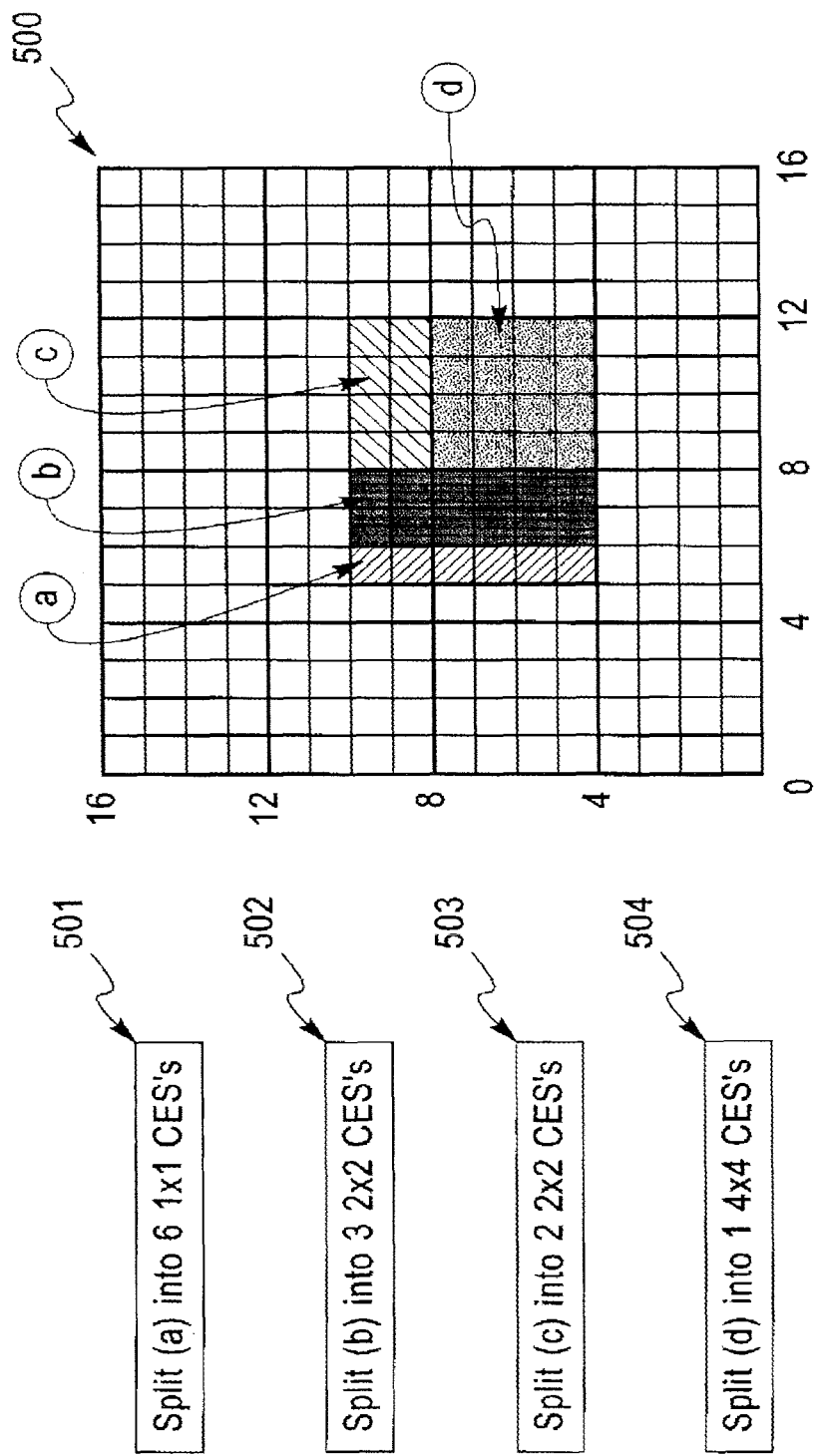
FIG. 5 is a diagram illustrating an example of the decomposition of a range query, according to one embodiment of the present invention.

FIG. 5 shows, as an example 500, the decomposition of a range query Q=(5,4,7,6). The process first strips away a column strip of width one from the leftmost column strip. This column strip is then split into six 1×1 CESs 501. Then, the process peels away a column strip of width two from the remaining Q and splits it into three 2×2 CESs 502. Next, a row strip of height two is stripped away and split into two 2×2 CESs 503. Finally, the remaining Q is divided into a single 4×4 CES 504.

Figure 6:
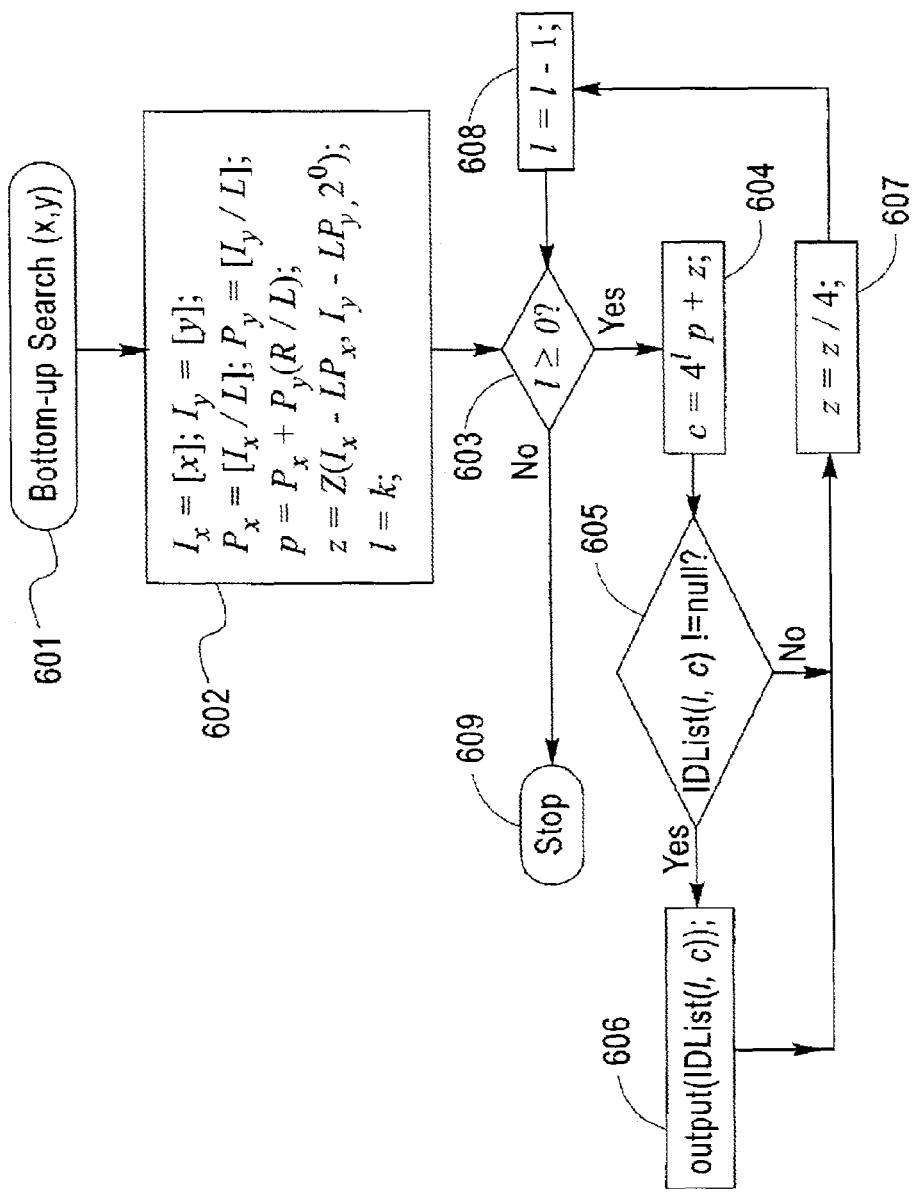
FIG. 6 is a diagram illustrating a methodology for searching a containment-encoded square-based range query index with a data point, according to an embodiment of the invention.

FIG. 6 shows the flow chart diagram for searching the CES-based range query index with a data point (x, y). For a given data point (x, y) (block 601), the search algorithm finds the k+1 CESs that contain or cover (x, y). It first, in step 602, finds the partition ID and the local ID of the level-k CES that contains (x, y). Let p denote the partition ID and z denote the local ID of the covering CES at level k. The partition ID can be computed as $p=P_x+P_y(R/L)$, where $P_x=\lfloor I_x/L \rfloor$ and $P_y=\lfloor I_y/L \rfloor$, and $I_x=\lfloor x \rfloor$ and $I_y=\lfloor y \rfloor$. In step 603, it is determined if l is greater than or equal to zero. The unique ID of the covering CES at level k is $4^k$ p+z, in step 604.

The local ID z is the Z-ordering of the unit-sized square with bottom-left corner at $(I_x-LP_x, I_y-LP_y)$. The local ID at level k−1 can be easily computed by dividing z by four, in step 607, because of containment encoding. This can be implemented by a logical right shift by two bits. As a result, the entire search operation is extremely efficient. If the entire query index can be fully loaded into main memory, the CES-based query index can handle a very rapid stream. For a given level (decremented each iteration by step 608), if the associated ID list is not empty, then the list is returned as the search result (steps 603, 605, 606). The search process stops after level 0 is reached 609.

Those skilled in the art will appreciate that existing range queries may be deleted from and new range queries inserted into the query index. As a result, the distribution of query sizes and query positions may change. The performance of the index search operations may change as a result. For example, if the query sizes are becoming large, the maximum CES side length L may need to be increased. On the other hand, if the query sizes are becoming smaller, then L may need to be decreased. Since we choose $L=2^k$, the increase of L means the doubling of its size and the decrease means the halving of its size. Furthermore, query positions may be outside the original monitoring region. In this case, the predefined CESs cannot be used to decompose those queries outside the monitoring region.

The CES-based query index described herein can be made adaptive to the changes in query sizes and query positions. The technical challenge when L is doubled or halved is that the labeling of the same unit-sized CES will be different. Fortunately, this different labeling can be systematically computed. To adapt to the doubling of L, a new set of pointer arrays can be created, one for each level. New queries inserted will be using the new pointer arrays and new labeling. Search operations will be conducted on both the new and the old pointer arrays. For the index maintained in the old pointer arrays, there are two alternatives.

The first one is to move all the query ID lists maintained in the old pointer arrays to the new pointer arrays. This moving process can be performed independent of the concurrent search operations. There would not be any race conditions where the search results would be erroneous.

The second alternative is to leave the old pointer arrays intact. When L is halved, a new set of pointer arrays can also be similarly created. For the query ID lists in the old pointer arrays, they can be migrated into the new pointer arrays by further decomposition.

Changes in query positions may cause some of the queries to be located outside the monitoring region. Namely, there might be some queries that are outside the R×R area. In this case, a new R×R monitoring region and another set of CES-based query index can be created to handle queries located within this new monitoring region. Queries overlapping with these two monitoring regions will be divided along the monitoring boundary. In other words, the same query is monitored by both indexes.

Figure 7:
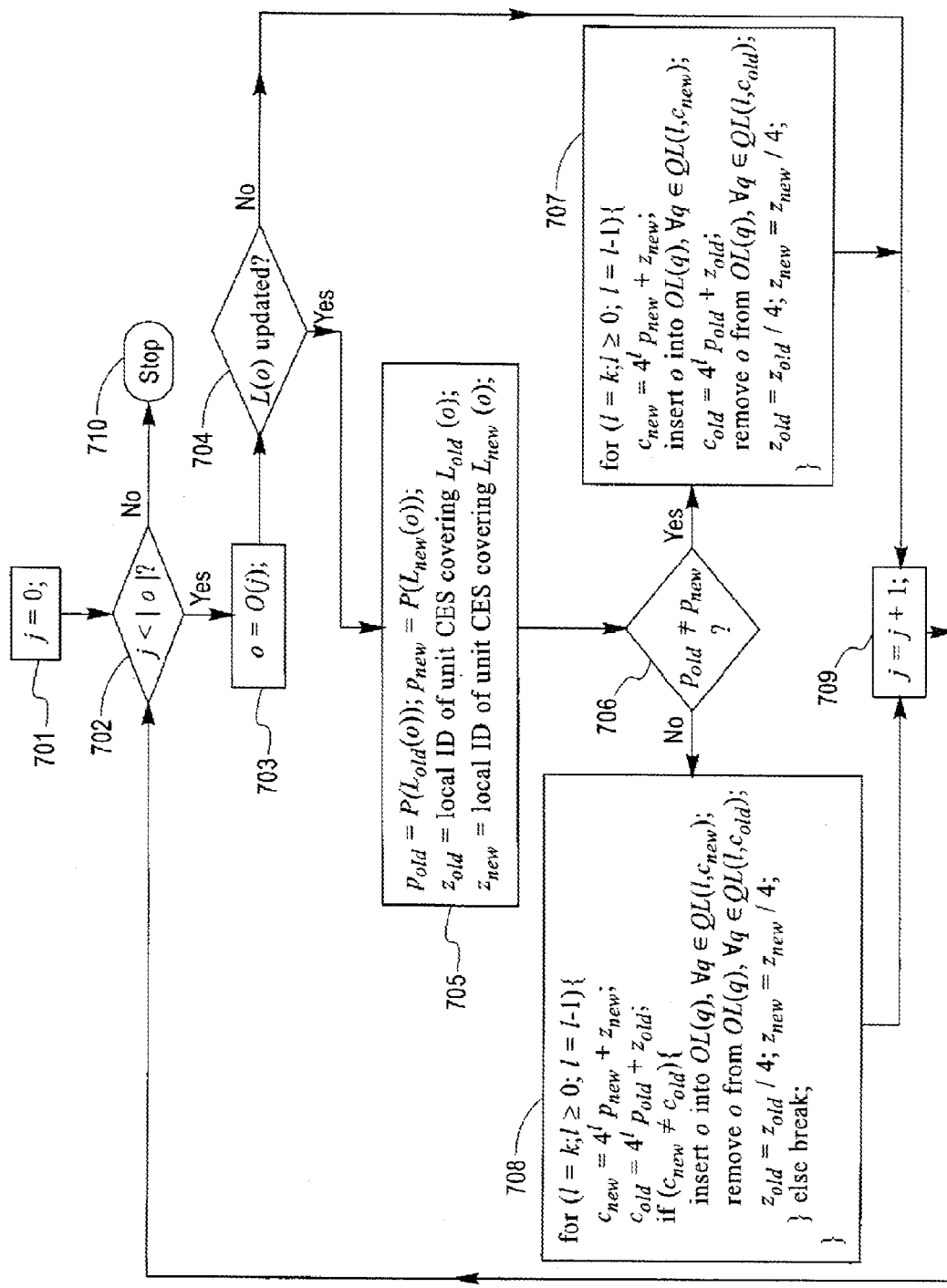
FIG. 7 is a diagram illustrating a methodology for processing continual range queries using a containment-encoded square-based query index for locating moving objects, according to an embodiment of the invention.

Turning now to the issue of location-aware services and applications, FIG. 7 shows an incremental algorithm for processing continual range queries using a CES-based query index for locating moving objects. Assume that query results are maintained in an array of object lists, one for each query. Assume that OL(q) denotes the object list for q. OL(q) contains the IDs of all objects that are inside the boundaries of q at the moment. In a query re-evaluation, all OL(q)'s, $\forall q \in Q$, where Q is the set of all continual range queries, are recomputed.

Because many objects might not have moved outside some CES boundaries since the last evaluation, the computation should be done incrementally. Namely, no computation needs to be performed for those objects that have not moved out of same CES boundaries since the last query re-evaluation. Containment encoding in the CESs makes it easy to identify the CESs that need not be visited during an incremental re-computation. We assume that the object locations used in the last re-evaluation are available. These locations are referred to as the old locations in contrast to the new locations for the current re-evaluation.

For each o∈O, denoting the set of all moving objects, if the location of o, denoted as L(o), has not been updated since the last re-evaluation, nothing needs to be done for this object. First, j is set to 0 (step 701), then it is tested against |O|, the size of O, (step 702). If j<|O| is true, then an object o is obtained from O (step 703) and tested to determine if this object has been updated since the last evaluation (step 704). If not, the process proceeds to the next object (step 709). If all the objects in O have been processed, then the algorithm stops (block 710). For an object whose location has been updated, the partition IDs of the old and new locations are computed, denoted as $p_{old}$ and $p_{new}$, respectively (step 705). The local ID of the unit CES that covers the old and new locations is also computed (step 705).

Depending on whether or not $p_{old}$ and $p_{new}$ are the same (step 706), some computation can be saved. If they are not the same, the object has since moved into a different partition (step 707). In this case, no computation can be saved. We need to insert o into and remove o from all the OL(q)'s for queries contained in the query ID lists associated with the CESs that cover the new and old locations, respectively (step 707). Here, QL(l,$c_{new}$) represents the query list pointed to by the CES at level-l and with an ID of $c_{new}$.

On the other hand, if $p_{old}$ and $p_{new}$ are the same, some CESs in the same partition may contain both the old and new locations (step 708). Hence, no action is needed for these CESs (707). Due to containment encoding, these CESs that contain both the old and the new locations can be easily identified by their local IDs. If $z_{old}$ equals $z_{new}$ for the level-l CES, then the computation can be saved for CESs from level-0 to level-l.

Figure 8:
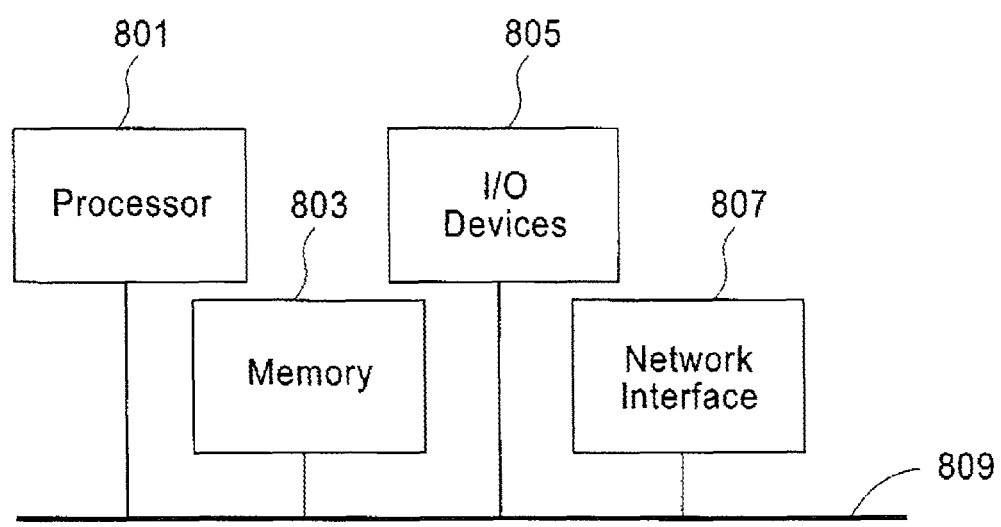
FIG. 8 is a diagram illustrating a computer system suitable for implementing a data stream processing system, according to one embodiment of the present invention.

Lastly, FIG. 8 illustrates an exemplary computing system environment for implementing a data stream processing system according to an embodiment of the present invention. More particularly, the functional blocks illustrated in FIG. 1A may implement such a computing system as shown in FIG. 8 to perform the techniques of the invention (e.g., as described above in the context of FIGS. 1B through 7). For example, a server implementing the data stream processing principles of the invention may implement such a computing system. Of course, it is to be understood that the invention is not limited to any particular computing system implementation.

In this illustrative implementation, a processor 801 for implementing at least a portion of the methodologies of the invention is operatively coupled to a memory 803, input/output (I/O) devices 805 and a network interface 807 via a bus 809, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit.

Still further, the phrase "network interface" as used herein is intended to include, for example, one or more devices capable of allowing the computing system 600 to communicate with other computing systems. Thus, the network interface may include a transceiver configured to communicate with a transceiver of another computing system via a suitable communications protocol, over a suitable network, e.g., the Internet, private network, etc. It is to be understood that the invention is not limited to any particular communications protocol or network.

It is to be appreciated that while the present invention has been described herein in the context of a data processing system, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 801.

In any case, it is to be appreciated that the techniques of the invention, described herein and shown in the appended figures, may be implemented in various forms of hardware, software, or combinations thereof, e.g., one or more operatively programmed general purpose digital computers with associated memory, application-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of evaluating one or more continual range queries over one or more moving objects, comprising the steps of:

maintaining, in a memory of at least one processing device comprising a processor coupled to the memory, a range query index with a plurality of containment-encoded virtual constructs associated with the one or more continual range queries over the one or more moving objects, the range query index comprising a decomposition of at least one range query into a minimal number of containment-encoded virtual constructs of varying sizes;

receiving, at the at least one processing device, an input data stream;

parsing, by the at least one processing device, the input data stream to extract one or more data values;

incrementally evaluating, by the at least one processing device, the one or more continual range queries for the extracted data values using the range query index, wherein the incrementally evaluating the one or more continual range queries comprises:

determining a current location of a given one of the one or more moving objects relative to a previous location of the given moving object; and responsive to determining that the current location of the given moving object is in a different containment-encoded virtual construct relative to the previous location of the given moving object, performing at least one computation for at least one continual range query involving the given moving object; and generating, by the at least one processing device, one or more alerts responsive to the evaluating the one or more continual range queries.

2. The method of claim 1, wherein the step of incrementally evaluating the one or more continual range queries further comprises:

identifying a largest containment-encoded virtual construct covering previous locations of one or more objects resulting from evaluation of the one or more continual range queries;

identifying the largest containment-encoded virtual construct covering current locations of the one or more objects; and based on the previous locations and the current locations of the one or more objects, refraining from performing one or more computations for object locations that are within the same containment-encoded virtual construct boundaries.

3. The method of claim 1, wherein responsive to determining that the current location of the given moving object is in a same containment-encoded virtual construct relative to the previous location of the given moving object, refraining from performing at least one computation for at least one continual range query involving the given moving object.

4. The method of claim 1, wherein the continual range queries define respective geographic regions of interest.

5. The method of claim 4, wherein the respective geographic regions of interest remain stationary over multiple evaluations of the continual range queries.

6. The method of claim 4, wherein a given one of the geographic regions of interest comprises a rectangle or a circle surrounding a landmark.

7. The method of claim 4, wherein the one or more moving objects comprise cellular phones.

8. The method of claim 1, wherein the step of maintaining the range query index further comprises at least one of adding one or more range queries to the range query index and removing one or more range queries from the range query index.

9. The method of claim 8, further comprising updating the decomposition of said at least one range query into the minimal number of containment-encoded virtual constructs of varying sizes responsive to adding one or more range queries to the range query index and removing one or more range queries from the range query index.

10. The method of claim 1, wherein the range query index is configured to be loaded into a main memory of the at least one processing device to enable stream processing of the input data stream.

11. An apparatus for evaluating one or more continual range queries over one or more moving objects, comprising:

a memory; and at least one processor coupled to the memory and configured to:

maintain, in the memory, a range query index with a plurality of containment-encoded virtual constructs associated with the one or more continual range queries over the one or more moving objects, the range query index comprising a decomposition of at least one range query into a minimal number of containment-encoded virtual constructs of varying sizes;

receive an input data stream;

parse the input data stream to extract one or more data values;

incrementally evaluate the one or more continual range queries for the extracted data values using the range query index, wherein the incrementally evaluating the one or more continual range queries comprises:

determining a current location of a given one of the one or more moving objects relative to a previous location of the given moving object; and responsive to determining that the current location of the given moving object is in a different containment-encoded virtual construct relative to the previous location of the given moving object, performing at least one computation for at least one continual range query involving the given moving object; and generate one or more alerts responsive to the evaluating the one or more continual range queries.

12. The apparatus of claim 11, wherein the at least one processor is further configured, responsive to determining that the current location of the given moving object is in a same containment-encoded virtual construct relative to the previous location of the given moving object, to refrain from performing at least one computation for at least one continual range query involving the given moving object.

13. The apparatus of claim 11, wherein the continual range queries define respective geographic regions of interest, the respective geographic regions of interest remain stationary over multiple evaluations of the continual range queries.

14. The apparatus of claim 13, wherein the one or more moving objects comprise cellular phones.

15. The apparatus of claim 11, wherein:

maintaining the range query index further comprises at least one of adding one or more range queries to the range query index and removing one or more range queries from the range query index; and the at least one processor is further configured to update the decomposition of said at least one range query into the minimal number of containment-encoded virtual constructs of varying sizes responsive to adding one or more range queries to the range query index and removing one or more range queries from the range query index.

16. An article of manufacture for use in evaluating one or more continual range queries over one or more moving objects, comprising a non-transitory machine readable medium containing one or more programs which when executed implement the steps of:

maintaining, in a memory of at least one processing device comprising a processor coupled to a memory, a range query index with a plurality of containment-encoded virtual constructs associated with the one or more continual range queries over the one or more moving objects, the range query index comprising a decomposition of at least one range query into a minimal number of containment-encoded virtual constructs of varying sizes;

receiving, at the at least one processing device, an input data stream;

parsing, by the at least one processing device, the input data stream to extract one or more data values;

incrementally evaluating, by the at least one processing device, the one or more continual range queries for the extracted data values using the range query index, wherein the incrementally evaluating the one or more continual range queries comprises:

determining a current location of a given one of the one or more moving objects relative to a previous location of the given moving object; and responsive to determining that the current location of the given moving object is in a different containment-encoded virtual construct relative to the previous location of the given moving object, performing at least one computation for at least one continual range query involving the given moving object; and generating, by the at least one processing device, one or more alerts responsive to the evaluating the one or more continual range queries.

* * * * *